United States Patent [19]

De Beurs et al.

[11] Patent Number: 5,304,288
[45] Date of Patent: Apr. 19, 1994

[54] METHOD OF AND DEVICE FOR THE SPARK EROSION OF HARDMEAL OBJECTS

[75] Inventors: Hans De Beurs; Antonius T. Rekers, both of Drachten, Netherlands

[73] Assignee: U.S. Philips Corporation, New York, N.Y.

[21] Appl. No.: 94,587

[22] Filed: Jul. 20, 1993

Related U.S. Application Data

[63] Continuation of Ser. No. 7,042, Jan. 21, 1993, abandoned, which is a continuation of Ser. No. 741,280, Aug. 7, 1991, abandoned.

[30] Foreign Application Priority Data

Aug. 8, 1990 [NL] Netherlands .......................... 9001787
Feb. 25, 1991 [NL] Netherlands .......................... 9100326

[51] Int. Cl.$^5$ ........................ B23H 7/02; B23H 11/00
[52] U.S. Cl. .................................. 204/129.1; 204/147; 204/206; 204/224 M; 204/284; 204/290 R; 204/292; 204/231; 219/69.12; 219/69.15; 219/69.17
[58] Field of Search .................. 204/129.1, 147, 196, 204/206, 211, 224 M, 228, 231, 284, 290 R; 219/69.12, 69.15, 69.17

[56] References Cited

U.S. PATENT DOCUMENTS

| | | | |
|---|---|---|---|
| 2,961,394 | 11/1960 | Williams et al. | 204/228 X |
| 3,278,411 | 10/1966 | Williams | 204/231 X |
| 3,723,268 | 3/1973 | Johns et al. | 204/129.55 X |
| 4,407,711 | 10/1983 | Baboian et al. | 204/228 X |
| 4,997,534 | 3/1991 | Thornton | 204/290 F X |

FOREIGN PATENT DOCUMENTS

| | | |
|---|---|---|
| 0176224 | 4/1986 | European Pat. Off. . |
| 61-284320 | 12/1986 | Japan . |
| 1-205931 | 2/1988 | Japan . |
| 2078587 | 1/1982 | United Kingdom . |

OTHER PUBLICATIONS

W. Wallace et al., "X-ray Measurements of Surface Residual Stresses in Cold Rolled-Brass", Advances in X-Ray Analysis, vol. 14, Plenum Press, New York, 1971, pp. 389-405.

Primary Examiner—Donald R. Valentine
Attorney, Agent, or Firm—Ernestine C. Bartlett

[57] ABSTRACT

A hardmetal object is cathodically protected from corrosion by a protective electrode during the spark-erosion process, which protective electrode is electrically connected to the hardmetal object via an external power source. The protective electrode is preferably plate-shaped.

11 Claims, 1 Drawing Sheet

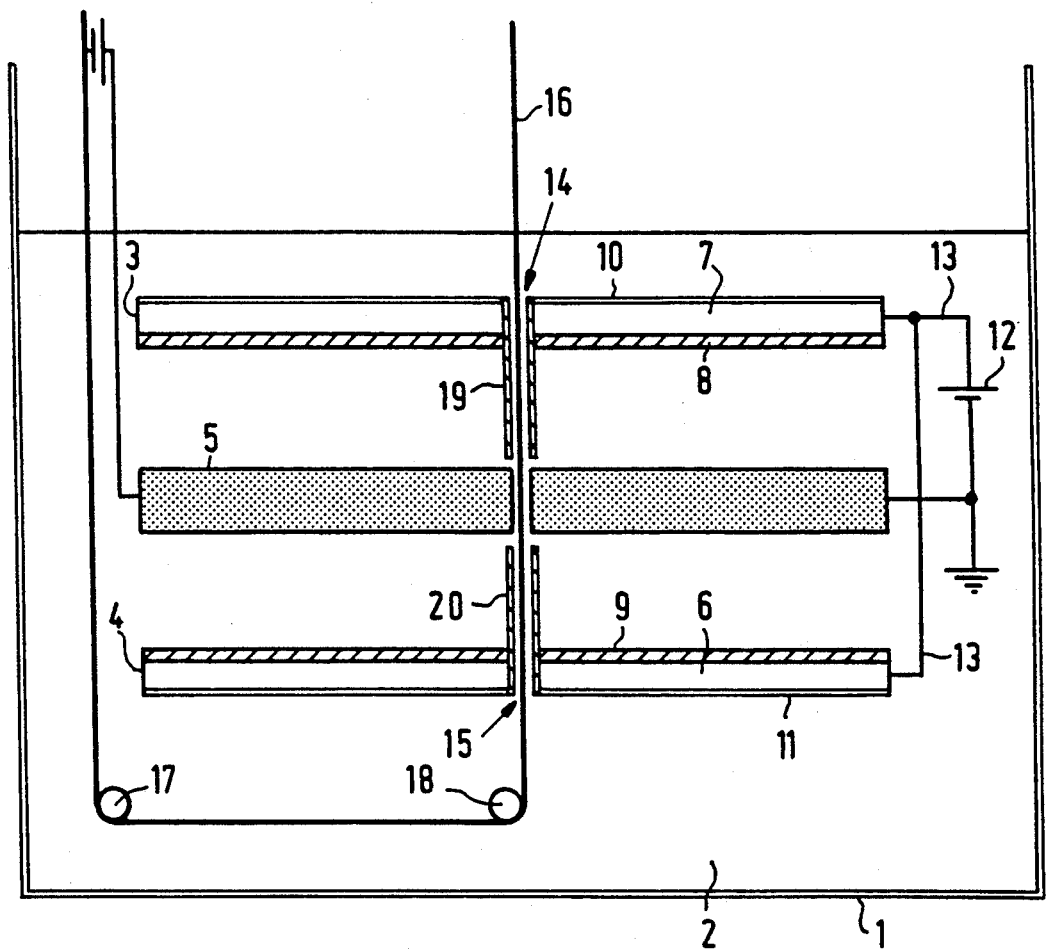

METHOD OF AND DEVICE FOR THE SPARK EROSION OF HARDMEAL OBJECTS

This is a continuation of application Ser. No. 08/007,042, filed Jan. 21, 1993, now abandoned which is a continuation of Ser. No. 07/741,280 filed Aug. 7, 1991, now abandoned.

BACKGROUND OF THE INVENTION

The invention relates to a method of machining a hardmetal object by means of spark erosion in an aqueous solution, utilizing measures which counteract corrosion of said object. The invention also relates to a spark-erosion device comprising a work vessel and a sparking wire electrode which is led through said work vessel.

Using the spark-erosion technique, hardmetal objects having a complicated or a simple configuration can be rapidly and accurately manufactured. For this purpose, a spark-erosion device is used which comprises a metal sparking wire electrode. In the spark-erosion process, the wire electrode is usually kept at a negative, pulsed, electric voltage of maximally several hundreds of volts relative to the object to be machined. The wire electrode can be used to cut the hardmetal, because under the influence of electric discharges particles are removed from the hardmetal. Hardmetal objects are to be understood to mean, in particular, objects of sintered metallic carbides and borides which also complete up to several tens of percents by weight of metals as binders. A well known and advantageously used example thereof is sintered WC comprising 10% by weight of Co.

Spark erosion takes place under a liquid in a work vessel. At present, demineralized water is preferably used for this purpose. The liquid has a desired, high electric resistance of at least $5.10^3$ Ohm.cm. Organic compounds increasing the discharge stabilization and/or reducing the wear of the wire electrode, may be dissolved in the demineralized water. Spark erosion of hardmetal objects in aqueous solutions has disadvantages. From European Patent Specification No. 176.224, it is known that corrosion of the faces which are cut in the object in the spark-erosion process may occur. In EP 176.224, a special bipolar pulse frequency of the voltage on the sparking wire electrode is proposed to alleviate this corrosion problem. Applicants have established that this measure is insufficient. The use of a bipolar pulse frequency does not provide a complete protection against corrosion of the hardmetal object.

SUMMARY OF THE INVENTION

It is an object of the invention to provide, inter alia, a method for the spark erosion of a hardmetal object in an aqueous solution, in which method hardly any or no corrosion at all takes place. A further object of the invention is to provide a spark-erosion device for machining hardmetal objects under conditions such that hardly any or no corrosion of the hardmetal takes place.

These and other objects of the invention are achieved by a method of the type mentioned in the opening paragraph, which is characterized in that during the spark-erosion process the object is cathodically protected by means of a protective electrode which is present in the solution and which is electrically connected to the object via an external power source.

The invention is also based on an improved insight in the corrosion processes which play a role in the spark erosion or hardmetal objects in aqueous solutions. Applicants have established that, in fact, two different corrosion processes are involved.

One of the corrosion processes is caused by the fact that the hardmetal to be machined is at a time-averaged positive electric potential relative to the wire electrode. This type of corrosion is often termed galvanic corrosion. It causes the faces cut in the object to be attacked. This type of corrosion can be reduced by adapting the pulse shape of the spark potential between the sparking electrode and the object to be machined.

The other corrosion process is cause by the surprisingly high corrosion current which hardmetal objects bring about in demineralized water. The corrosion current is caused by the dissolution of the binder of the hardmetal. In the case of hardmetal on the basis of WC comprising Co as a binder, Co dissolves in the form of $Co^{2+}$, as a result of which the hardmetal is negatively polarized relative to the aqueous solution. The dissolution of the binder particles causes the surface of the hardmetal to be weakened, so that chipping can readily take place when the hardmetal is subjected to a mechanical load. The chipping may take place, in particular, when the machined hardmetal object is used as a stamping or punching tool.

Unlike the former corrosion process, the latter corrosion process does not only take place at the cut faces but throughout the surface of the hardmetal object in so far as it is present in the aqueous solution. It has been proved that oxygen present in the aqueous solution considerably accelerates the corrosion process. The necessary flushing operation by means of water bring about a relatively high oxygen content in the aqueous solution. Further, it has been found that the latter corrosion process is accelerated due to the negative polarization of the wire electrode. This causes the magnitude of the negative polarization of the hardmetal object to be reduced relative to the aqueous solution during the spark-erosion process. This brings about a higher corrosion current.

The above-mentioned recognition has lead to the method according to the invention. By virtue of the cathodic protection by means of an external power source and a protective electrode, the magnitude of the negative polarization of the hardmetal object is increased relative to the aqueous solution during the spark-erosion process. As a result thereof, the corrosion current and, hence, the corrosion of the hardmetal are substantially reduced. The corrosion reduction takes place throughout the surface of the hard metal.

As the protective electrode is polarized relative to the hardmetal object, a protective current is created in the aqueous solution, said protective current being opposite to the corrosion current. To attain sufficient protection against corrosion, the protective current must at least be equal to the corrosion current. Preferably, the protective current is a few times higher than the corrosion current.

Further is has been found that cathodic protection by means of a standard sacrificial anode, for example a Zn-electrode, without external power source does not lead to satisfactory results. An acceptable protection against corrosion can be attained by using a standard rod-shaped Pt-electrode which is electrically connected to the hardmetal object through an external power source.

A preferred embodiment of the method according to the invention is characterized in that the protective electrode is plate-shaped and is held substantially parallel to a surface to be protected of the hardmetal object during the spark-erosion process, and in that the protective electrode is kept at a positive voltage relative to the object.

It has been found that in this manner a much better protection against corrosion can be realized than by using a rod-shaped, standard Pt-electrode. When the Pt-electrode is used, a uniform density of the protective current throughout the surface of the hardmetal cannot be attained. Due to this, the magnitude of the polarization of the hardmetal relative to the aqueous solution is not the same everywhere. This leads to an increased corrosion. When a plate-shaped, protective electrode is used a uniform current density on the surface to be protected of the hardmetal object can be realized.

Another preferred embodiment of the method according to the invention is characterized in that the object is arranged between two plate-shaped protective electrodes, and in that the protective electrodes are kept at a positive voltage relative to the object during the spark-erosion operation. In general, the hardmetal objects are manufactured from a plate-shaped member. The use of two plate-shaped protective electrodes which are held parallel to the two main surfaces of such a plate-shaped, hardmetal body results in a two-sided protection against corrosion during the spark-erosion process.

A further embodiment of the method according to the invention is characterized in that the positive voltage is 10–100 V. At this voltage, the protective current in demineralized water appears to be approximately 200 $\mu A/cm^2$. This is a number of times higher than the corrosion current of hardmetal (WC comprising Co as a binder) in demineralized water, which is 20–50 $\mu A/cm^2$. Under these conditions, an excellent protection against corrosion is obtained.

The invention also relates to a spark-erosion device comprising a work vessel and a sparking wire electrode which is led through the work vessel. According to the invention, the device is characterized in that the work vessel contains one or two electrically conducting protective electrodes, an in that the electrode(s) is (are) provided with at least an electrical connection which can be connected to a hardmetal object to be machined via an external power source.

A preferred embodiment of the spark-erosion device is characterized in that one surface of the electrode(s) is electrically conducting and the other surface is electrically insulated. During the spark-erosion operation, the electrically insulated surface of the electrode(s) must be facing away from the object to be machined. It has been found, that it is desirable to insulate one of the surfaces of each electrode in order to preclude the derangement of the spark generator as well as the occurrence of leakage currents to other conducting parts, such as the wire guides and clamping tools, in the work vessel. The electrically conducting surface may consist of a layer of electrically conducting material, such as Au or graphite. The electrically conducting surface preferably consists of Pt.

A further preferred embodiment of the spark-erosion device according to the invention is characterized in that the electrode(s) is(are) provided with a through-hole for the sparking wire electrode, in which hole an electrically insulating wire envelope is fixed. Thus, during the spark-erosion process said wire envelope, through which the sparking wire electrode runs, is present between the protective electrode(s) and the object to be machined. The wire envelope may comprise, for example, a synthetic resin sleeve which is clamped at one end in the aperture of the electrode. The use of the sleeve results in a considerably improved liquid flow around the sparking electrode at the location where the spark-erosion operation takes place. By virtue thereof, an improved discharge of the material sparked-off in the operation is obtained, so that fewer material particles get between the protective electrode(s) and the machined object. As a result, the homogeneous, electric current distribution between the electrode(s) and the object can be better maintained, so that the protective current density over the surface to be protected of the object cannot become too small. Another important advantage of the presence of the wire envelope relates to the protection of the object from galvanic corrosion. The part of the sparking electrode located between the object and the electrode(s) could be subject to said corrosion. This part of the sparking electrode is at an average negative voltage of a few tens of volts relative to the object.

BRIEF DESCRIPTION OF THE DRAWINGS

The invention will be explained in greater detail by means of an exemplary embodiment and with reference to the accompanying drawing, in which:

The sole FIGURE shows that part of a spark-erosion device according to the invention, in which the spark-erosion process takes place.

DESCRIPTION OF THE PREFERRED EMBODIMENTS

The FIGURE is a diagrammatic, sectional view of the part of the spark-erosion device where the actual spark-erosion process takes place. The part comprises a work vessel 1 which is filled with demineralized water 2. The work vessel contains two parallel, electrically conducting plates 3, 4 between which there is arranged a hardmetal object 5 to be machined. The hardmetal object consists of WC comprising Co as a binder. Preferably, the plates 3, 4 largely consist of a respective synthetic resin carrier 6, 7 which is provided with an electrically conducting respective layer 8, 9 of Pt at the surface facing the object to be machined. It is alternatively possible to use a carrier 6, 7 of steel plate. In the latter case, the surface of the plates facing away from the object must respectively be provided with an electrically insulating lacquer layer 10, 11. Both plates are connected to the hardmetal object with electrically conducting wires 13 via a d.c. voltage source 12 (diagrammatically shown). During the spark-erosion process the electric voltage is 10–100 V. By virtue thereof, a protective current is attained which is several times higher than the corrosion current.

The plates 3, 4 are provided with a respective through-hole 14, 15. An electrically insulating wire envelope 19,20 in the form of a sleeve may be provided in the apertures respectively 14,15, the wire envelope, through which the sparking wire electrode runs, extending between the protective electrode and the object. During the spark-erosion process rinsing water flows through the wire envelopes. The rinsing water entrains the sparked-off material. An electric, pulsed voltage of 200–220 V relative to the hardmetal to be machined is applied to the plates 3,4 during the spark-erosion process. The sparking wire electrode is led through the work vessel via pulley guide members 17, 18. Plates 3, 4 and object 5 are fixed (not shown) to the wall of the work vessel in known manner via an electrically insulated clamping tool. During spark erosion, the hardmetal object moves relative to the protective electrodes and the sparking wire electrode.

By means of the above device, the formation of corrosion on hardmetal during spark erosion can be effectively precluded. This will be made clear by means of the following experiments.

A hardmetal object of WC comprising Co as a binder was machined in a spark-erosion process in demineralized water without cathodic protection for 24 hours. In this case, the plates 3, 4 and the external power source 12 were absent. Microscopic examination (enlargement 500×) showed that the surface of the hardmetal was attacked by corrosion to a depth of 20–50 μm.

The experiment was repeated with cathodic protection under otherwise identical conditions. In this case, the spark-erosion device shown in the drawing was used. In a visual, microscopic examination (enlargement 500×) carried out after a 24 hour spark-erosion process, no signs of corrosion were found on the surface of the hardmetal object.

We claim:

1. A method of machining a hardmetal object by means of spark erosion in an aqueous solution, said method comprising measures which counteract corrosion of said object, including the step of protecting the object cathodically during the spark-erosion process with a protective electrode which is present in the solution and which is electrically connected to the object via an external power source.

2. A method as claimed in claim 1, wherein the protective electrode is plate-shaped, the electrode is positioned substantially parallel to a surface to be protected of the hardmetal object during the spark-erosion process, and the protective electrode is maintained at a positive voltage relative to the object.

3. A spark-erosion device comprising a work vessel and a sparking wire electrode which is led through the work vessel, said work vessel containing at least one plate-shaped, electrically conducting protective electrode, and said at least one electrode includes an electrical connection adapted to be connected to a hardmetal object to be machined via an external power source.

4. A spark-erosion device as claimed in claim 3 wherein the at least one electrode has a through-hole for the sparking wire electrode, and an electrically insulating wire envelope fixed in said hole.

5. A device as claimed in claim 4 wherein one surface of the at least one electrode is electrically conducting and the other surface is electrically insulated.

6. A device as claimed in claim 5 wherein the electrically conducting surface of the at least one electrode consists of Pt.

7. A device as claimed in claim 5 wherein one surface of the at least one electrode is electrically conducting and the other surface is electrically insulated.

8. A device as claimed in claim 7, wherein the electrically conducting surface of the at least one electrode consists of Pt.

9. A method of machining a hardmetal object by means of spark erosion in an aqueous solution, said method comprising measures which counteract corrosion of said object and including the step of protecting the object cathodically during the spark-erosion process with two plate-shaped protective electrodes which are present in the solution and which are electrically connected to the object via an external power source, the protective electrodes being maintained at a positive voltage relative to the object.

10. A method as claimed in claim 9 wherein the positive voltage is 10–100 V.

11. A method of machining a hardmetal object by means of spark erosion in an aqueous solution, said method comprising measures which counteract corrosion of said object and including the step of protecting the object cathodically during the spark-erosion process with a plate-shaped protective electrode which is present in the solution and which is electrically connected to the object via an external power source, said protective electrode being positioned substantially parallel to a surface of the hardmetal object to be protected during the spark-erosion process, said method also comprising the step of maintaining the protective electrode at a positive voltage of 10–100 V relative to the object.

* * * * *